May 20, 1930.  W. T. POWELL  1,758,971
FREQUENCY CHANGER
Filed July 28, 1925
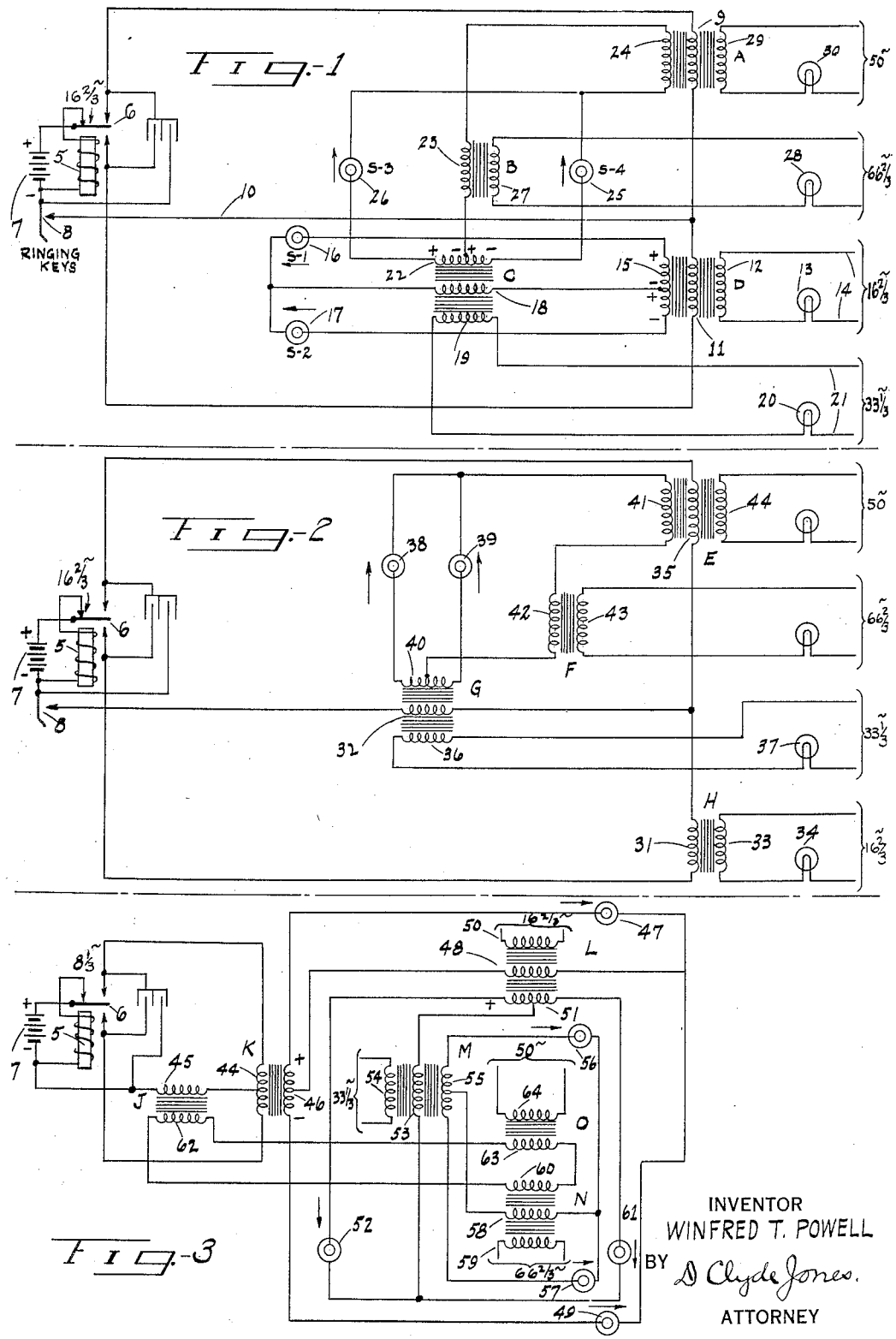

Patented May 20, 1930

1,758,971

UNITED STATES PATENT OFFICE

WINFRED T. POWELL, OF ROCHESTER, NEW YORK, ASSIGNOR TO THE STROMBERG-CARLSON TELEPHONE MANUFACTURING COMPANY, OF ROCHESTER, NEW YORK, A CORPORATION OF NEW YORK

FREQUENCY CHANGER

Application filed July 28, 1925. Serial No. 46,674.

This invention relates to an arrangement for providing ringing current of the proper frequency to actuate the signals on party telephone lines. In certain arrangements for telephone systems where ringing current generators are not provided it has been customary to provide a series of vibrators actuated from the storage battery at the telephone exchange, which operate to interrupt the current from this battery at frequencies suitable to operate the harmonic signals at the various substations.

In accordance with the present invention it is proposed to reduce the number of vibrators necessary and substitute therefor devices having no inertia.

In the drawings, Fig. 1 shows a circuit arrangement providing frequencies of ringing current suitable for use in a harmonic ringing system for telephone exchanges. In this arrangement one vibrator and a plurality of rectifying devices and transformers are employed.

Fig. 2 shows a modified form of the invention which differs from Fig. 1 in that a lesser number of rectifying tubes are employed.

Fig. 3 shows a still different modification of the invention in which the vibrator operates at a frequency of eight cycles per second instead of sixteen cycles per second, but this arrangement requires a greater number of rectifying tubes than in either of the other arrangements.

Any type of rectifying device may be used in this arrangement; one suitable device is shown on page 633 of the article on Control of Gaseous Conduction, by Bush and Smith in the Journal of the American Institute of Electrical Engineers, issue of September, 1922.

Referring to Fig. 1, 5 represents a magnet whose armature 6 intermittently breaks the energizing circuit of the magnet 5 at the rate of sixteen and two-thirds times per second. The magnet 5 and its armature 6 comprise the well known sixteen-cycle type of vibrator operating from a storage battery such as 7. This vibrator operates continuously and has its contacts connected by a condenser to prevent sparking, but the circuits controlled by the vibrator are not closed until one or more ringing keys such as 8, mounted on a switchboard (not shown), are operated. When the armature 6 is closed in its upper position, a circuit is completed from battery through the winding 9 of the transformer A and thence through conductor 10 and the contacts 8 of the ringing key or keys, to the other side of the storage battery. When the armature 6 is in its lower position a circuit is closed from the positive pole of battery, armature 6 and its lower contact, thence through the winding 11 of transformer D, conductor 10, to the opposite pole of the battery. This results in an alternating current having a frequency of sixteen and two-thirds cycles being induced in the winding 12 of the transformer D. The terminals of this transformer winding are connected through the usual ringing lamp 13 to the ringing leads 14 associated with cord circuits of a telephone system. The current through the winding 11 of the transformer D is also effective to induce current in the winding 15 of this transformer, and since this winding is tapped at its mid-point and since its end terminals are connected through the rectifier tubes 16 and 17 as shown, both halves of the sixteen and two-thirds cycle wave will flow through the winding 18 of the transformer C. If the rectifier tubes transmit current only in the direction as indicated by the arrows, it will be seen that when the upper terminal of the winding 15 is positive, current will flow through the tube 16 and a center winding 18 of the transformer C in series. During this half of the wave no current will flow through the tube 17. However, during the succeeding half of the wave the current flow will be transferred from tube 16 to 17 and then return by way of the winding 18 of transformer C. It will thus be seen that for each cycle of current through the center winding of transformer D, two cycles will be produced in the winding 18 of transformer C and an alternating current of double the frequency of the vibrator will be established in the lower winding 19 of transformer C. The terminals of this last mentioned winding are connected through the usual ringing lamp 20 to the common ringing leads 21. By means of the upper winding of the transformer C tapped at its mid-point and wired through the winding 23 of transformer B and the winding 24 of transformer A thence back to the terminals of winding 22 of transformer C, through the rectifier tubes 25 and 26, current of double the frequency of that flowing through the winding 18 of transformer C is produced in the left-hand winding 23 of the transformer B. This means that the thirty-three and two-thirds cycle current is doubled in frequency in a manner similar to that in which the sixteen cycle current was doubled by means of the tubes 16 and 17. As a result of this control, pulsations of sixty-six and two-thirds cycle current will flow through the winding 23 of transformer B and produce in the right-hand winding 27 thereof, an alternating current having a frequency of sixty-six and two-thirds cycles. The terminals of the last named winding are connected through the usual ringing lamp 28 to the well known ringing conductors. It will be noted that the sixteen and two-thirds cycle current controlled by the armature 6 passes through the center winding 9 of the transformer A, also the sixty-six and two-thirds cycle current flowing through the winding 23 of transformer B passes through the winding 24 of the transformer A. This results in the production of the right-hand winding 29 of transformer A of a frequency which is equal to the difference of the frequencies passing through the other two windings of the transformer, namely, fifty cycles. The terminals of the right-hand winding 29 are wired through the usual ringing lamp 30 to the common ringing leads.

It will be understood that a filter may be provided in the circuit of winding 29 to effectively transmit fifty cycle current and which will exclude the sixteen and two-thirds and sixty-six and two-thirds cycle components.

A modification of the invention is shown in Fig. 2. The electromagnet 5 with its vibrating armature 6 produces pulsating current of sixteen and two-thirds cycles frequency through the left-hand winding of the transformer H, when the armature is in its lower position. This circuit extends from the positive pole of the battery 7, armature 6 in its lower position, winding 31 of transformer H and middle winding 32 of the transformer G and through the contacts 8 of the ringing key to the negative side of the battery. This induces current in the secondary winding 33 of transformer H, which includes the lamp 34 in series with the previously mentioned ringing leads. Similarly when the armature 6 is in its upper position, a circuit is closed from the positive pole of battery, armature 6 and its upper contact, middle winding 35 of the transformer E, thence through the middle winding 32 of transformer G to the negative side of battery, as previously described. It will thus be seen that with each closure of the contacts associated with the vibrating armature 6, a circuit is closed through the middle winding 32 of the transformer and since this armature closed its upper armature sixteen and two-thirds times per second and likewise closes its lower armature an equal number of times per second, current will pulsate in the winding 32 of transformer G at the rate of thirty-three and one-third times a second. The secondary winding 36, associated with the winding 32 is included with the lamp 37 in series with the well-known ringing leads. The upper winding 40 of the transformer G is connected through rectifying tubes 38 and 39 and thence by way of the left-hand windings 41 and 42 of the transformers E and F, back to the center tap of the upper winding 40 of transformer G. This connection results in the producing in the secondary winding of the transformer F sixty-six and two-thirds cycle current. Current of fifty cycle frequency is induced in the winding 44 of the transformer E due to the effect of the sixty-six and two-thirds cycle current flowing in the winding 41 and the sixteen and two-thirds cycle frequency current flowing in the winding 35 of the mentioned transformer. As is well known a "beating" or heterodyne effect between these frequencies results in the production of current of a frequency equal to the difference of the mentioned frequencies.

In Fig. 3 there is shown an additional modification, in which the vibrator including the magnet 5 and the armature 6 operates at a frequency of eight and one-third cycles per second, but in this arrangement a greater number of rectifying tubes are employed. When the vibrator including the armature 6 is in its upper position, a circuit is closed from the positive pole of battery 7 through the upper portion of the winding 44 of the transformer, winding 45 of transformer J to the negative side of battery. Similarly when the vibrator armature 6 is in its lower position, the positive side of battery 7 is connected to the lower half of the winding 44 and thence through the winding 45 to the negative side of battery. When these circuits are closed in such a manner that the upper terminal of winding 46 is positive, current will flow through the upper half of this winding and thence through the rectifying tube 47, the middle winding 48 of transformer L and thence to the mid-point of winding 46. When the vibrating armature closes one of the previously mentioned circuits in such a manner that the lower terminal of the winding 46 is positive, current will flow through the lower half of this winding, rectifying tube 49 and thence through the winding 48 of transformer L to the mid-point of winding 46. It will be noted that the middle winding 48 of transformer L is included in each of these circuits, whenever current flows through either the upper or lower winding 46, a resultant current of sixteen and two-thirds cycle frequency is induced in the upper winding 50 of transformer L. This last named winding, as has been explained, is included in circuit with the well known ringing leads. When current in the center winding 48 of transformer L is flowing in such a direction, that the polarity of the lower winding 51 of the transformer L is positive as indicated by the positive sign in the figure, current will flow through the left-hand portion of winding 51 and thence through the rectifying tube 52, middle winding 53 of the transformer M to the mid-point of winding 51. Since the pulsations of current in the two parts of the winding 51 are double the frequency of current in the center winding, which is sixteen and two-thirds cycles per second, there will be produced in the center winding 53 of transformer M, current of thirty-three and one-third cycles per second, which in turn will be induced in the secondary winding 54 of transformer M, which is in series with the mentioned common ringing leads. Current of double the frequency of that present in the windings 53 and 54 is produced by means of the two portions of the winding 55 of the transformer M. The portions of this transformer are included in circuits, one of which includes the rectifying tube 56 and the other the rectifying tube 57 and both of these circuits include the middle winding 58 of the transformer N. The frequency of the current flowing in winding 53 is thirty-three and one-third cycles per second and due to the rectifying action of the rectifying tubes 56 and 57 and the two portions of the secondary winding 55, current of double this frequency is present in the middle winding 58 of transformer N. Current of this frequency is then induced in the secondary winding 59 of the mentioned transformer, which is included in series with the mentioned ringing leads. It will be noted that the winding 44 of transformer K is connected in series with the winding 45 of transformer J, whose terminal is connected to the negative side of battery. Since both halves of the eight and one-third cycle wave pass through the winding 45, alternating current of sixteen and two-thirds cycles is induced in the winding 62 of the transformer J. This winding 62 is connected in series with the winding 60 of transformer N and the winding 63 of transformer O. Since the winding 63 includes current of sixteen and two-thirds cycles per second and since the winding 63 also includes current of sixty-six and two-thirds cycles per second, the difference of these two frequencies, that is fifty cycles is induced in the winding 64, which is included in the common ringing leads.

It will be understood that while the so-called S type of tube is shown in the present disclosure, any other device which has the property of unilateral conductivity such as a thermionic tube may be used instead of the rectifying tubes referred to. If thermionic tubes are employed, it will then be necessary to provide suitable filament heating current, which may be provided either by means of a so-called "A" battery of the storage type or the filament may be heated by alternating current induced in an additional winding on one of the transformers employed in these diagrams.

What I claim is:

1. The method of producing a plurality of currents of predetermined frequency from a single source of current which consists in interrupting the current flow from said source in uniform time intervals, changing the interrupted current to alternating current, multiplying the frequency of said alternating current, multiplying the frequency of said multiple frequency current, heterodyning certain of said currents to produce an additional multiple frequency current, and delivering said multiple frequency currents for use.

2. In a system for producing ringing currents of different frequencies for signalling polystation telephone lines, a source of current, means for cyclically varying the current from said source, means for transforming said varying current into alternating current, means for multiplying the frequency of said alternating current to produce two multiple frequency currents of different frequencies, and means for combining said multiple frequency currents to produce an additional multiple frequency current differing in frequency from the two others.

3. In a system of the class described, a source of current, means for cyclically interrupting current from said source, means for transforming said interrupted current into alternating current, means including two circuit networks for multiplying the frequency of said alternating current to produce two multiple frequency currents of different frequencies, means including portions of said mentioned means for combining said two multiple frequency currents for producing a multiple frequency current of different frequency from the other two, and means including ringing keys for rendering said multiple frequency currents effective.

4. In a system of the class described, a source of direct current, means for cyclically varying the current from said source, means for transforming said varying current into alternating current, means including a plurality of networks provided with unilateral conducting devices for producing currents having multiple frequencies of said alternating current, and means including a portion of said network for producing a third multiple frequency current by heterodyning said first mentioned multiple frequency currents.

5. In a frequency multiplier, a source of cyclically varying current, a transformer having a primary winding connected in series with said source of current, a secondary winding for said transformer, a circuit including two rectifying devices connecting the terminals of said secondary winding, a conductor connecting a point on the circuit between said rectifying devices and an intermediate point on said secondary winding, said conductor including a winding of a second transformer whose primary winding is connected in series with portions of said first mentioned secondary winding, an output circuit inductively connected to said conductor, a third circuit inductively coupled to the winding of said second transformer, and a fourth circuit inductively coupled to said first mentioned primary winding.

In witness whereof, I hereunto subscribe my name this 25th day of July, A. D. 1925.

WINFRED T. POWELL.